April 23, 1940.    D. McDONALD    2,198,412
REMOVAL AND RECOVERY OF SOLVENT
Filed Jan. 2, 1935    2 Sheets-Sheet 1

Fig. 1.

INVENTOR.

Patented Apr. 23, 1940

2,198,412

UNITED STATES PATENT OFFICE 2,198,412

REMOVAL AND RECOVERY OF SOLVENT

Dan McDonald, Los Angeles, Calif., assignor, by mesne assignments, to Engineering Incorporated, a corporation of California Application January 2, 1935, Serial No. 59

14 Claims. (Cl. 34—24)

This invention is of general utility for drying materials such as fabrics, meal, etc., from which oils, greases and the like have been removed by a suitable solvent; and has for its object to rapidly and efficiently dry the materials by evaporating the solvent and transferring it to another part of the system.

The present application is a continuation of my copending application Ser. No. 639,200, filed October 24, 1932, and also includes certain features of invention which are not disclosed in said copending application.

The solvent, such as carbon tetrachloride or trichlorethylene, is evaporated from the materials after having removed oils, greases, etc., and may then be recovered for reuse, the solvent and its vapors being preferably circulated under partial vacuum in a closed system so as to simplify the apparatus and avoid loss of solvent vapors.

The solvent which has dissolved oils, grease and the like, and which has then been removed from the materials being cleaned, may be regenerated by distillation, and heat from the vapors of distillation may be utilized as the latent heat which is absorbed by the solvent vapors when evaporating from the materials. As a consequence the solvent which is to be evaporated from the materials may be maintained at boiling temperature to insure rapid evaporation and thorough drying of the materials, and the evaporating solvent having absorbed a part of the heat of the vapors of distillation, these distilled vapors may be subsequently condensed and returned to storage with economical operation of the condenser.

The heat energy generated in the still may be utilized for superheating the distilled vapors which supply the latent heat for evaporating the solvent from the materials, so that the distilled vapors are at such temperature as will supply the necessary heat for evaporating the solvent and still leave the distilled vapors at a temperature which will avoid their condensation while supplying the necessary heat of evaporation.

The same result may be accomplished, i. e., the vapors from the still may be supplied to the solvent which impregnates the materials, at a higher temperature than the boiling point of said solvent, by maintaining the system under partial vacuum with a higher degree of vacuum at the solvent which is to be evaporated than at the still which supplies the vapors.

The solvent may also be economically evaporated from the materials by vaporizing any suitable liquid having a boiling point at least as high as that of the solvent, and introducing this vapor, steam for example, for supplying latent heat of evaporation, with the partial vacuum in the system lowering the boiling point of the solvent so that the vapor may be economically supplied at such higher temperature as will evaporate the solvent. When steam is employed, it displaces all traces of the solvent so as to freshen and deodorize the materials.

Centrifuging may also be employed for extracting solvent from the materials, with vapors of distillation and/or steam or vapors of any other liquid having a boiling point at least as high as that of the solvent, supplying latent heat of evaporation during the centrifuging.

It is a still further object of the invention to form a relatively thin but compact annular layer of the materials defining a closed space within said annular layer, the only outlet from which is through the compact materials, and to supply vaporized liquid to said closed space, with lower pressure maintained at the exterior of the annular layer of materials, whereby the pressure differential insures the vapors, steam for example, passing through the compact materials in intimate contact with all portions thereof, with a relatively small volume of steam evaporating all traces of the solvent which still impregnates the materials.

It is a still further object of the invention to operate the system under partial vacuum so that the solvent vapors are drawn from the still and from the materials which have been cleaned, into a condenser, and thence to the means which is employed for creating the partial vacuum; in order that the vacuum creating means need not have the large capacity which would be required if solvent vapors were first handled by the vacuum creating means and subsequently condensed.

A balanced system may thus be employed, with the solvent which is withdrawn from the materials and which is then regenerated by distillation, supplying sufficient heat to vaporize all the solvent remaining in the materials, and with all of the solvent vapors then condensed and returned to storage for reuse in the cycle of operation, the entire cycle of operation being maintained by a vacuum creating means of relatively small capacity, since the vacuum creating means is not required to handle the solvent vapors before they have been condensed.

Further objects of the invention will be readily understood from the following description of the accompanying drawings, illustrating the invention in somewhat diagrammatic form and in which:

Fig. 1 illustrates one embodiment of apparatus for carrying out the invention.

Figure 2:
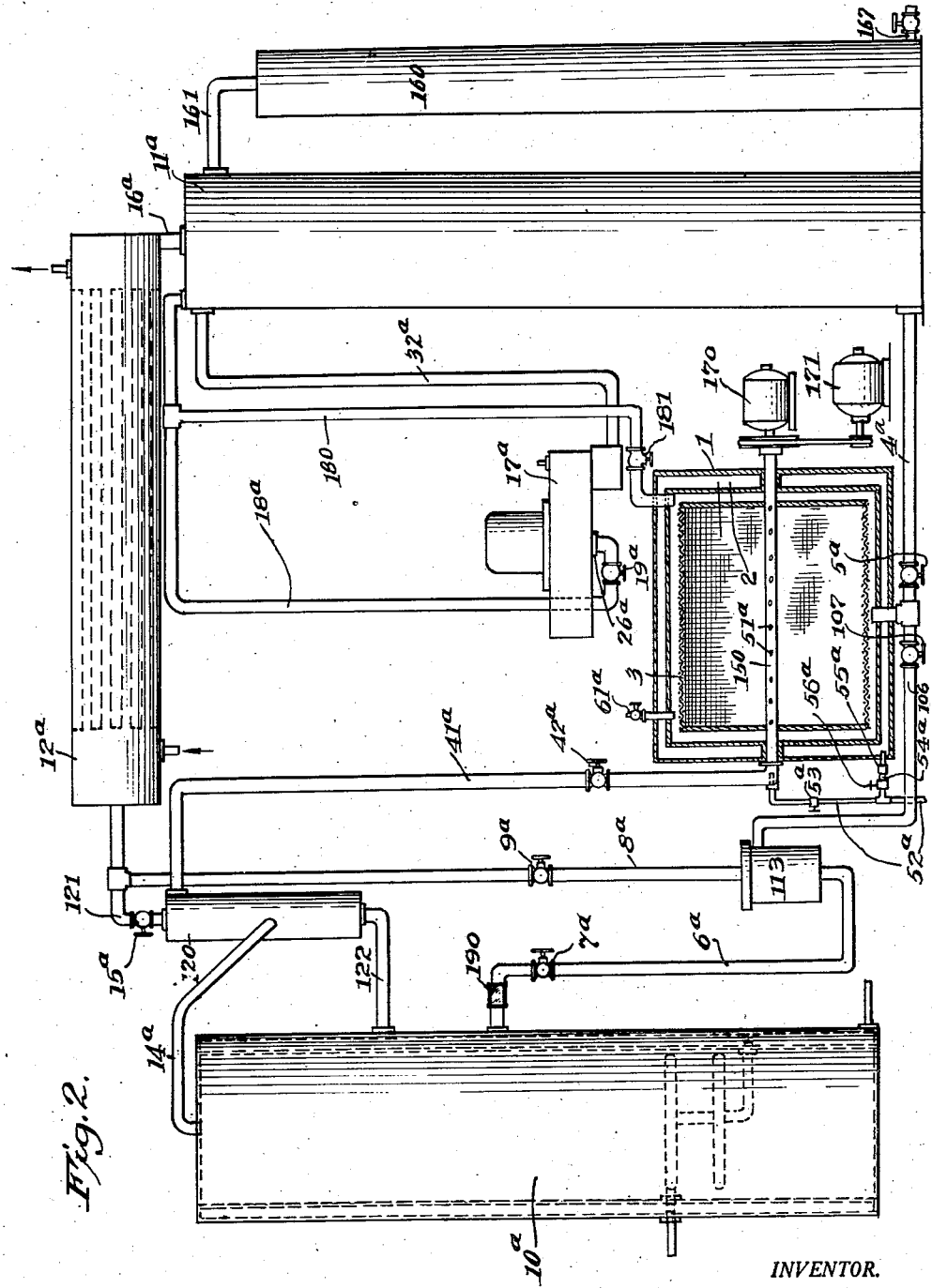
Fig. 2 illustrates a modified embodiment of such apparatus.

A solvent, such as trichlorethylene, adapted to remove grease, oils, etc., from fabrics, meal or other material, is supplied to a container for the material, the container being shown as a horizontal cylinder 1 such as employed for dry cleaning garments and extracting oil from meal. The cylinder is preferably jacketed as shown at 2, and has an inner revolving cage 3 in which the material to be treated is placed for tumbling action when the cage is revolved. The solvent is supplied to cylinder 1 through a pipe 4 having a valvular control 5, and the cage 3 is perforated or of screen construction so that the materials are agitated and immersed in the solvent when the cage is revolved. After the solvent has removed oil, grease, etc., the materials are dried and deodorized in the container.

As illustrated at Fig. 1 a drain pipe 6 for the liquid solvent leads from the bottom of cylinder 1 and is provided with a valvular control 7, and a pipe 8 for solvent vapors leads from the top of cylinder 1 and is provided with a valvular control 9. The liquid solvent which is drained off through pipe 6 is regenerated by distillation, with the distilled vapors then condensed and returned to storage for reuse; and the solvent vapors which are withdrawn through pipe 8 are also condensed, preferably in the same condenser, and are then preferably returned to the same storage receptacle for reuse. As an instance of this arrangement a still 10 may be positioned alongside the container 1, with a storage tank 11 above the container and a condenser 12 above the storage tank. The drain pipe 6 leads to the still, preferably through a lint trap 13, and a pipe 14 for distilled vapors leads from the still to the condenser 12 and is provided with a valvular control 15. The pipe 8 also leads to the condenser, preferably through a lint trap 60, and the condensed solvent is withdrawn from the condenser to the storage tank 11 by a pipe 16.

The system as thus described is a closed system, and for economy and rapidity of evaporation, distillation and subsequent condensation, a partial vacuum is maintained in the system during the drying operation, and this partial vacuum is adapted to circulate the solvent through the system. As an instance of this arrangement storage tank 11 is connected to the intake of a vacuum pump 17 by a pipe 18 having a valvular control 19, so that the vacuum pump is adapted to create a partial vacuum in the closed system. The solvent is withdrawn as vapor through pipe 8 and thence through the condenser to the storage tank; and is withdrawn in liquid phase through pipe 6 and is then vaporized in still 10 from whence the distilled vapors are drawn through pipe 14 to the condenser and the storage tank. A sight glass 20 may be provided on the storage tank for observing flow of solvent and noting the level of any water accumulating in the storage tank above the solvent; and the sight glass is preferably provided with drain cocks 21 so that by opening a cock above the solvent level and at the same time opening a vent 22 on the storage tank, the accumulated water may be periodically drained off. The supply pipe 4 leads from the bottom of the storage tank and is adapted for gravity flow of solvent to the cylinder 1; and in order to avoid a vortex being formed at the mouth of the supply pipe while the solvent is being withdrawn, such as might result in water being drawn from above the solvent into the supply pipe, the mouth of the pipe is preferably an enlarged bowl 23 adapted to draw off the solvent from the storage tank with no appreciable agitation. A valve 63 which cooperates with a valve seat 62 may control withdrawal through pipe 4, and the valve is float actuated as shown at 64, with the float adapted to sink in water accumulating in the storage tank above the solvent level but adapted to float on the surface of the solvent, so that the valve is normally open but will close in the event of the solvent level being so lowered as to result in water instead of solvent being withdrawn at the pipe 4.

The vacuum pump 17 is illustrated as of the type shown in my U. S. Letters Patent No. 2,022,682, granted December 3, 1935. As an instance of this construction the pump casing may contain a quantity of the same kind of solvent as has been used for dissolving oil and grease from the material contained in the cage 3, e. g., trichlorethylene, and this body of fluid, shown at 24, is drawn into the rotor 25 of the pump and is discharged from the periphery of the rotor so as to create a partial vacuum at the pump intake 26 which communicates with the pipe 18. Fluid is thus drawn into the pump through the pipe 18 and is discharged from the periphery of the rotor. The solvent and any water in the system, having passed through the condenser 12, will substantially all be in liquid phase when collected in the storage tank 11, and the fluid withdrawn via the pipe 18 which communicates with the upper portion of the storage tank above the outlets for the liquid solvent and the water, will thus comprise the air in the system which it is desired to exhaust in order to create a partial vacuum, free of solvent and water except for any slight traces of solvent which have not condensed and collected in the storage tank but which are drawn through the pipe 18 while still in vapor phase. The air, with any slight traces of solvent vapors, which is thus drawn into the pump and discharged from the periphery of the rotor 25, is compressed in the closed pump casing so as to condense any traces of solvent vapors. Excess of solvent accumulating in the pump casing may be drained off and returned to storage tank 11 via a pipe 32 having a float controlled valve 33.

In order to prevent loss of any slight trace of solvent vapors which may escape at the outlet 29, a trap 34 is preferably connected to the outlet, and may be filled with water and have baffles 34ᵃ, with the outlet 29 connected to the lower end of the trap by an inverted U-pipe 35. The water in the trap thus condenses any last traces of solvent, with the solvent condensate settling below the water so that the water seals against escape of solvent vapors, while permitting air to bubble upwardly through the water seal and finally discharge to the atmosphere via a vent 34ᵇ. Any solvent vapors which are thus condensed in the trap, may be returned to storage tank 11 via a pipe 36 leading from the bottom of the trap and having a valvular control 37.

The solvent vapors from still 10 are adapted for return to cylinder 1, as well as being adapted for flow through the pipe 14 to the condenser 12; and for this purpose a pipe 41 leads from the still to the cylinder 1, and is provided with a valvular control 42. The vapors in pipe 41 may be superheated by means of a heat exchanger as shown in the embodiment of the invention which is illustrated at Fig. 1. As an instance of this arrangement a water chamber 43 of the still is heated by a burner 44, and from the water chamber circulation is established through heating coil 45 of the still, and thence through a pipe 46 to a heat exchanger 47 and back to the water chamber via pipe 48. The solvent which is supplied to the still through pipe 6 is vaporized by the heating coil 45, and the pipe 41 through which the vapors are adapted for return to cylinder 1 extends through the heat exchanger 47 so that the temperature of the vapors is appreciably increased by the higher temperature to which the water circulating through the heat exchanger has been raised by the burner 44.

Means are also provided for injecting steam into cylinder 1; and for this purpose a pipe 50 projects into the lower portion of the cylinder and is provided with jet openings 51, and steam is supplied to pipe 50 through a steam line 52 having a valvular control 53. The jacket 2 of cylinder 1 is a heating jacket, and steam may be applied thereto from the steam line 52, as for example through a branch line 54 having a low pressure regulator 55 and a valvular control 56.

When operating the plant, materials such as garments to be dry cleaned, or rags, waste, etc., from which grease and oil are to be removed, or meal from which oil is to be recovered, are placed in cage 3, the outer cylinder 1 is then closed, and solvent such as trichlorethylene is supplied to cylinder 1 from storage tank 11 by opening the valve 5 in the supply pipe 4. The valve 5 is then closed and the cage 3 is revolved, the valves 7 and 9 being closed so that the solvent is confined in the container, and the valves 53 and 56 being also closed. The valve 42 is closed so that the still 10 is not in communication with the container; and if all the solvent from a previous operation has been regenerated, the valve 15 is also closed so that the still 10 is idle, but the pump 17 is preferably in operation with the valve 19 open, so as to maintain a partial vacuum in that part of the system which includes the condenser 12 and the storage tank 11.

When the solvent has removed the grease, oil, etc., from the materials in the container, it is drained off and regenerated in the still 10, and the remaining solvent is evaporated so as to completely dry and deodorize the materials, with the cage 3 preferably continuing to revolve during the drying operation.

At the start of the drying operation valves 7 and 15 are opened and steam is supplied to jacket 2 by opening valve 56, thereby heating and expanding the solvent in cylinder 1. Pressure is thus created in the cylinder, so that the partial vacuum in the circulating system drains off liquid solvent through the pipe 6, and the solvent is vaporized in the still 10 which has been put into operation, and the solvent vapors may then be drawn into condenser 12 through the pipe 14, from whence the condensate is returned to storage tank 11.

When all of the liquid solvent has been drained off, the valve 7 is closed and valve 9 is opened so that the partial vacuum in the circulating system evaporates solvent from the container 1 and withdraws the solvent vapors through pipe 8 into condenser 12, from whence the condensate is returned to storage tank 11. At the same time distillation of the liquid solvent which has been drawn into still 10 is continued, and these solvent vapors may be returned to the condenser via pipe 14.

In lieu of return of solvent vapors from the still 10 to the condenser 12 via the pipe 14 thus far described, all, or at least a part of the solvent vapors from the still, may be returned to the container 1 and thence to the condenser 12, so that the heat of the regenerated solvent which would otherwise be a waste product which would have to be handled by the condenser 12, is utilized for supplying latent heat for vaporizing remaining liquid solvent in the container 1. For this purpose the valve 15 is closed and the valve 42 is opened at such time during the cycle of operation that the vapors of the distillation process which are then returned to the container 1 before passage to the condenser 12, will be sufficient to vaporize all remaining liquid solvent in the container 1, thus providing a balanced system. The heat of the regenerated solvent which is thus utilized, may be increased by superheating the solvent vapors coming from the still. For this purpose the vapors from the still 10 may pass through heat exchanger 47 and are then returned to cylinder 1 via pipe 41. These superheated solvent vapors thus furnish the heat of vaporization absorbed by the solvent when evaporating, and thus maintain the solvent at boiling temperature so that evaporation is not retarded. By superheating the distilled vapors in the heat exchanger, they are readily and economically raised to a temperature adapted to supply the heat of vaporization absorbed by the evaporating solvent, and still leave the distilled vapors at a temperature above their dew point so as to avoid condensation in cylinder 1.

After the valve 42 has been opened and evaporation of solvent has been continued until substantially all of the solvent has been extracted, the valve 42 is closed and the valve 53 in steam line 52 is opened. The line 52 carries dry steam under appreciable pressure which is discharged through jets 51 into the materials in cage 3; and the dry steam displaces any remaining traces of solvent and furnishes heat of vaporization absorbed by the evaporating solvent, so as to assure all traces of the solvent being vaporized and withdrawn.

The steam may be injected for approximately two minutes so as to leave the garments fresh and dry and with no odor of solvent, and all of the solvent vapors having been drawn off through pipe 8 and returned to storage tank 11, valves 9 and 53 are closed, and after a vent 61 on cylinder 1 has been opened the garments are removed.

While the preferred operation is that as described, with the steam introduced subsequent to introduction of superheated solvent vapors of the distillation process, it will be understood that with certain materials steam may be used alone and in lieu of superheated solvent vapors for supplying latent heat for evaporating solvent from the materials, and that while solvent vapors of the distillation process and steam have been particularly described for supplying this latent heat, any suitable liquid having a boiling point at least as high as that of the solvent, might be vaporized in a suitable apparatus (not shown), and supplied to cylinder 1 at a temperature higher than that of the solvent therein, for evaporating the latter.

In the modification of the invention shown at Fig. 2, drain pipe 106 leads from cylinder 1 to a trap 113 and is provided with a valvular control 107. A pipe 6ª for liquid solvent leads from the bottom of the trap and is provided with a valvular control 7ª, and a pipe 8ª for solvent vapors leads from the top of the trap and is provided with a valvular control 9ª. Pipe 6ª leads to a still 10ª, and a pipe 14ª for distilled vapors leads from the still to a separator 120, from whence distilled vapors flow through a pipe 121 to a condenser 12ª, the pipe 121 being provided with a valvular control 15ª. Condensate is returned from the separator to the still through a pipe 122. The pipe 8ª also leads to the condenser 12ª, and from the condenser solvent is discharged into a storage tank 11ª through a pipe 16ª. A tank 160 communicates with tank 11ª as shown at 161, and collects any water accumulating in the solvent storage tank, the water tank being provided with a drain 162. A supply pipe 4ª leads from the tank 11ª to the cylinder 1 and is provided with a valvular control 5ª.

The storage tank 11ª is connected by pipe 18ª to the intake 26ª of a vacuum pump 17ª such as previously described, the pipe 18ª having a valvular control 19ª. Solvent condensate from the pump casing may be returned to storage tank 11ª via a pipe 32ª. A pipe 180 connects the cylinder 1 and the pipe 18ª and has a valvular control 181; and the cylinder 1 has a vent 61ª.

Solvent vapors from still 10ª may be returned to cylinder 1 through a pipe 41ª leading from the separator 120 and having a valvular control 42ª; and the vacuum pump 17ª draws fluid through the system either from cylinder 1 via pipes 106 and 6ª, still 10ª, and pipes 14ª and 121 to the condenser 12ª, or from still 10ª, via pipes 14ª and 41ª, cylinder 1, and pipes 106 and 8ª to the condenser 12ª depending upon selective manipulation of the valvular controls as hereinafter described. From the condenser 12ª the vacuum pump draws fluid through the pipe 16ª into the storage tank 11ª with the pump 17ª maintaining a partial vacuum via the pipe 18ª, and with substantially all of the solvent and any water in the system collecting in the storage tank 11ª in liquid phase, having passed through the condenser, and with the pipe 18ª which communicates with the upper portion of the storage tank above the outlets for the liquid solvent and the water, thus drawing off the air in the system which it is desired to exhaust in order to create a partial vacuum in the system, with the air free of solvent and water, except for any slight traces of solvent which have not condensed and collected in the storage tank but which are drawn through the pipe 18ª while still in vapor phase. The still 10ª is at a point in the system further away from the vacuum pump than the cylinder 1 when the flow is from the still 10ª via pipe 41ª, cylinder 1, pipe 8ª and thence to the condenser, so that a higher vacuum is maintained in cylinder 1 than in the pipe 41ª.

The pipe 41ª may discharge into cylinder 1 through a hollow rotatable shaft 150 on which cage 3 is mounted, the hollow shaft being provided with jet openings 51ª. Steam may also be discharged into cylinder 1 through the jets 51ª, as for example via a steam line 50ª which has a valvular control 53ª. The steam may be supplied from a line 52ª, which may also supply steam to jacket 2, through a branch line 54ª having a low pressure regulator 55ª and a valvular control 56ª.

The cage 3 may be revolved at slow speed by a motor 171 during the time that the materials in the cage are being treated with solvent; and during subsequent evaporation of the solvent the cage 3 may be revolved at high speed by a motor 170 in order to extract solvent by centrifuging.

In operation, with the vent 61ª and the valves 107, 5ª, 42ª and 181 closed, the cage 3 is charged with the material which is to be treated with a suitable solvent, and the cylinder 1 is then closed.

Solvent is supplied to cylinder 1 from storage tank 11ª by opening valves 5ª the valve 181 being also opened to permit gravity flow of the solvent. The valves 5ª and 181 are then closed and the cage 3 is slowly revolved by the motor 171 until the solvent has dissolved the oil, grease or the like which it is desired to remove from the material in the revolving cage. The valves 107 and 7ª are then opened and with valves 42ª and 8ª closed, solvent is drained from cylinder 1 via pipe 106 and is drawn into the still 10ª via pipe 6ª, by the vacuum created in the system by opening the valves 15ª and 19ª and operating the vacuum pump 17ª. When solvent no longer shows at a sight glass 190 in the pipe 6ª, the cage 3 is revolved at high speed by means of the motor 170 in order to extract additional solvent by centrifuging; and when sight glass 190 shows that no further solvent is being extracted the valve 7ª is closed. If a rinse is desired the valve 5ª is opened and the operation as thus far described is repeated; and when solvent no longer shows at sight glass 190 the valve 7ª is again closed. The solvent drawn into still 10ª is vaporized, with the vapors of distillation flowing through pipes 14ª and 121 into condenser 12ª, and the condenser solvent returning thence to storage tank 11ª.

Any solvent remaining with the materials in cage 3 is now removed by evaporation, with the motor 170 preferably rotating the cage at high speed during this evaporation, and with steam supplied to the jacket 2 via the valve 56ª. Valves 9ª and 42ª are opened and the valve 15ª is closed, valve 107 remaining open and valve 7ª remaining closed so that vapors from the still do not flow to the condenser 12ª but are returned to cylinder 1 via pipe 41ª, and the flow is thus from the still 10ª to the cylinder 1 and thence via pipe 8ª to the condenser 12ª. As previously described, when the flow is via this route, the vacuum pump 17ª maintains a higher vacuum in cylinder 1 than in pipe 41ª, and therefore the dew point of the vapors in the cylinder, which are heated to the boiling point by the steam in jacket 2, is lower than that of the vapors of distillation in the still 10ª and the pipe 41ª. The vapors returned via pipe 41ª therefore have a higher temperature than the boiling point of the solvent in the cylinder, and these vapors are dry enough and the pressure differential is such that the higher temperature of the vapors will furnish the heat of vaporization absorbed by the solvent when evaporating, while still leaving the distilled vapors at a temperature above their dew point so as to avoid condensation in cylinder 1.

After or in lieu of returning the vapors of distillation to cylinder 1 to supply heat of vaporization, steam may be supplied to cylinder 1, the valve 42ª being closed and the valve 15ª opened, with the valves 107 and 9ª remaining open and the valve 7ª remaining closed, so that vapors from the still 10ª flow to the condenser 12ª, and the valve 53ª being opened to discharge steam from the jets 51ª into the cage 3. Since the solvent in cylinder 1 is under appreciable vacuum, its boiling point is lowered so that the temperature of the steam which is introduced is considerably above the boiling point of the solvent.

A small portion of the steam is condensed, displacing the solvent from the materials in cage 3, and the steam supplies latent heat of vaporization to evporate any remaining solvent and thoroughly dry the materials.

By rapidly rotating the cage 3 while solvent is being evaporated, the materials in the cage are held against the perforated peripheral wall of the cage, and the ends of the cage being imperforate the materials form an enclosure into which jet orifices 51ª discharge. The vapors of distillation and/or the steam discharged at the jet orifices must therefore pass through the materials at the periphery of the revolving cage before they discharge via pipe 106 for return to condenser 12ª, so that solvent is extracted by centrifuging and at the same time is rapidly displaced and evaporated by the vapors of distillation and/or the steam.

In this form of the invention and in connection with certain materials it is also possible to utilize vapors other than steam or solvent vapors of the distillation process for supplying latent heat, any suitable liquid having a boiling point at least as high as that of the solvent being vaporized in suitable apparatus (not shown), with said vapors supplied to the cylinder 1 at a temperature higher than that of the solvent in the cylinder, for evaporating the solvent.

I claim:

1. In combination, a container for material from which soluble substances are to be removed by use of a liquid solvent, a storage tank for the liquid solvent, a supply pipe leading from the storage tank to the container, a still for regenerating the solvent used, a drain pipe leading from the container to the still, a condenser having a vapor inlet and a condensate outlet, the vapor inlet of the condenser being connected for selective communication with the still or the container, the condensate outlet of the condenser being connected to the storage tank, a solvent vapor supply pipe leading from the still to the container, the aforementioned elements comprising a closed system, a vacuum pump having its inlet connected to the storage tank above the level of the condensate therein, and valvular controls for closing the drain pipe and adapting the vacuum pump to maintain a partial vacuum in the system, increasing along the solvent vapor supply pipe from the still toward the container and thence successively toward the condenser, storage tank and vacuum pump, whereby solvent vapors of the regeneration process are supplied from the still to the container at a higher temperature than the boiling point of the liquid solvent in the container for vaporizing said solvent, with the vaporized solvent then withdrawn from the container and condensed and returned to storage.

2. In a method of removing and recovering solvent from material from which soluble substances have been displaced in a system utilizing distillation for regeneration of the solvent used; the steps including: centrifuging the material while confining the same so as to define a closed annulus, conducting solvent vapors of the distillation process to the interior of the closed annulus, withdrawing solvent vapors from the material through the closed annulus of said material, condensing said solvent vapors, and maintaining the system under partial vacuum exerted on the condensate so that the partial vacuum increases in the direction of flow of the solvent vapors and whereby the solvent vapors of the distillation process are conducted to the interior of the closed annulus of material at a higher temperature than the boiling point of the solvent in said material for vaporizing said solvent.

3. In a method of removing and recovering solvent from material from which soluble substances have been displaced by use of a solvent; the steps including: centrifuging the material while confining the same so as to define a closed annulus, vaporizing a liquid which has a boiling point at least as high as that of the solvent, conducting vapors of said vaporization process to the interior of the closed annulus of material, withdrawing solvent vapors from the material through the closed annulus of said material, condensing said solvent vapors and maintaining the system under partial vacuum exerted on the condensate so that the partial vacuum increases in the direction of flow of the vapors and whereby the vapors of the vaporization process are conducted to the interior of the closed annulus of material at a higher temperature than the boiling point of the solvent in said material for vaporizing said solvent.

4. In a method of drying material from which soluble substances have been displaced by use of a solvent; the steps including: centrifuging the material while confining the same so as to define a closed annulus, and discharging steam into the interior of the closed annulus of material while maintaining a partial vacuum at the exterior of the closed annulus of material, whereby the solvent in the material is vaporized and withdrawn through the closed annulus of material.

5. In a method of drying material from which soluble substances have been displaced by use of a solvent; the steps including: centrifuging the material while confining the same so as to define a closed annulus, and supplying vapor of a liquid, which has a boiling point at least as high as that of the solvent, to the interior of the closed annulus of material while maintaining a partial vacuum at the exterior of the closed annulus of material, whereby the solvent in the material is vaporized and withdrawn through the closed annulus of material.

6. In combination, a container, a cage in the container for material treated with a liquid solvent, the cage having a perforated periphery and closed ends, means for rotating the cage to maintain a closed annulus of the material against the perforated periphery of the cage, with the ends of said annulus closed by the ends of the cage, a still for regenerating the solvent used, means for conducting liquid solvent from the container to the still, means for supplying solvent vapor from the still to the interior of said closed annulus, a condenser having an inlet and an outlet, the inlet of the condenser being connected to the container, and means for maintaining a partial vacuum in the system increasing from the still toward the interior of said closed annulus and thence through the material and into the container and thence toward and through the condenser and thence toward the vacuum maintaining means.

7. In combination, a container, a cage in the container for material treated with a liquid solvent, the cage having a perforated periphery and closed ends, means for rotating the cage to maintain a closed annulus of the material against the perforated periphery of the cage, with the ends of said annulus closed by the ends of the cage, a condenser having an inlet and an outlet, the inlet of the condenser being connected to the container, means communicating with the outlet of the condenser for collecting condensate, means for maintaining a partial vacuum in the system increasing through the closed annulus of material into the container and thence toward and through the condenser and thence toward the condensate collecting means, the partial vacuum being exerted above the condensate in said collecting means, and means for supplying steam to the interior of said closed annulus of material for contact with said material.

8. In a method of removing and recovering solvent from material from which soluble substances have been displaced in a closed system utilizing distillation for regeneration of the solvent used; the steps including: agitating the material, providing decreasing pressure in one direction through the closed system for preventing opposite flow of gas or vapor, conducting solvent vapor of the distillation process to the material in the direction of decreasing pressure for contact with the agitated material at higher temperature than the boiling point of the solvent in the material while continuing to agitate the material, withdrawing all gas and vapor from the material in the direction of decreasing pressure, condensing the withdrawn vapor, and withdrawing all condensate and non-condensables in the direction of decreasing pressure.

9. In a method of drying material dampened with a solvent for oil and the like, the steps including: centrifuging the material while confining the same so that it extends around an interior space defined by said material, in such manner that a fluid can escape from the space only through the material and supplying a vaporized liquid to the interior space while maintaining lower pressure at the exterior of the material for flow of vapor from the interior space through the material and to the zone of lower pressure for vaporizing solvent in the material.

10. In a method of drying material dampened with a solvent for oil and the like, the steps including: centrifuging the material while confining the same so that it extends around an interior space defined by said material and also defines a space extending around said material at the exterior thereof, in such manner that a fluid can pass from one such space to the other only through the material and supplying a vaporized liquid to one of said spaces while maintaining lower pressure in the other of said spaces for flow of vapor from said one of said spaces through the material and to the zone of lower pressure in said other of said spaces for vaporizing solvent in the material.

11. In a method of drying material dampened with a solvent for oil and the like, the steps including: confining the material so that it extends around an interior space defined by said material and also defines a space extending around said material at the exterior thereof, in such manner that a fluid can pass from one such space to the other only through the material and supplying a vaporized liquid to one of said spaces while maintaining lower pressure in the other of said spaces for flow of vapor from said one of said spaces through the material and to the zone of lower pressure in said other of said spaces for vaporizing solvent in the material.

12. In a method of drying material dampened with a solvent for oil and the like, the steps including: centrifuging the material while confining the same so that it extends around an interior space defined by said material and also defines a space extending around said material at the exterior thereof, and supplying vapor of a liquid which has a boiling point at least as high as that of the solvent, to one of said spaces while maintaining a partial vacuum in the other of said spaces for flow of vapor from one of said spaces through the material and to the zone of partial vacuum in said other of said spaces for vaporizing solvent in the material.

13. In a method of drying material dampened with a solvent for oil and the like, the steps including: centrifuging the material while confining the same so as to define a complete annulus with closed ends, supplying a vapor of a liquid, which has a boiling point at least as high as that of the solvent, to the interior of the closed annulus of material while maintaining lower pressure at the exterior of the closed annulus of material, whereby solvent in the material is vaporized and withdrawn through the closed annulus of material to the zone of lower pressure at the exterior thereof.

14. In a method of removing solvent from pieces of material, the steps of: forming a body from a plurality of pieces of material dampened with a solvent upon a movable perforated support within an enclosed zone and in the virtual absence of a body of liquid solvent in such manner that the zone is divided by the body and support and the divided parts of the zone communicate only through the body and support; supplying heat to said zone; and supplying hot drying vapors of a liquid which has a boiling point at least as high as that of the solvent to said enclosed zone on one side of said support while maintaining a lower pressure on the other side of said support to establish flow of said drying vapors through said body of pieces of material for vaporizing solvent in said material.

DAN McDONALD.